US008241783B2

(12) United States Patent
Tsuji

(10) Patent No.: US 8,241,783 B2
(45) Date of Patent: Aug. 14, 2012

(54) BATTERY LID STRUCTURE FOR ELECTRONIC DEVICE

(75) Inventor: Kunio Tsuji, Kyoto (JP)

(73) Assignees: Panasonic Corporation, Osaka (JP); Canon Kabushiki Kaisha, Tokyo (JP)

( * ) Notice: Subject to any disclaimer, the term of this patent is extended or adjusted under 35 U.S.C. 154(b) by 514 days.

(21) Appl. No.: 12/523,325

(22) PCT Filed: Jan. 10, 2008

(86) PCT No.: PCT/JP2008/050177
§ 371 (c)(1),
(2), (4) Date: Jul. 16, 2009

(87) PCT Pub. No.: WO2008/090766
PCT Pub. Date: Jul. 31, 2008

(65) Prior Publication Data
US 2010/0040946 A1    Feb. 18, 2010

(30) Foreign Application Priority Data
Jan. 25, 2007 (JP) .................. 2007-014385

(51) Int. Cl.
*H01M 2/08* (2006.01)

(52) U.S. Cl. ........... 429/175; 429/97; 429/100; 429/163

(58) Field of Classification Search .................. 429/175, 429/97, 100, 163
See application file for complete search history.

(56) References Cited

U.S. PATENT DOCUMENTS

| 5,567,545 A | * | 10/1996 | Murakami | 429/163 |
| 2004/0224220 A1 | * | 11/2004 | Wang et al. | 429/96 |
| 2006/0154136 A1 | * | 7/2006 | Ge et al. | 429/97 |

FOREIGN PATENT DOCUMENTS

| JP | 2003-142841 | | 5/2003 |
| JP | 2003142841 | * | 5/2003 |

* cited by examiner

*Primary Examiner* — Ula C Ruddock
*Assistant Examiner* — Patricia Davis
(74) *Attorney, Agent, or Firm* — Steptoe & Johnson LLP

(57) ABSTRACT

A battery lid structure for an electronic device is provided which has a battery lid allowing a battery case to be opened when a battery lid body slides. A long engagement hole L-shaped in plan view is formed on a pressing plate to which the battery lid body is slidably attached. A lock lever section and a lock lever receiving section where an engagement section is formed are attached to the battery lid body so as to slide perpendicularly to the sliding direction. The engagement of the engagement section with a second long hole of the long engagement hole prevents the sliding motion of the battery lid body. During the sliding motion of the battery lid body, the engagement section engages with a first long hole of the long engagement hole. The wall surface of the long engagement hole is covered with a part of a plate spring body.

1 Claim, 3 Drawing Sheets

BATTERY LID STRUCTURE FOR ELECTRONIC DEVICE

TECHNICAL FIELD

The present invention relates to a battery lid structure for opening and closing a battery case provided in an electronic device.

BACKGROUND ART

In the prior art, various structures have been proposed as battery lids for opening and closing battery cases provided in electronic devices. For example, a battery lid structure for a camera is disclosed in Patent document 1 as follows: a hinge plate is supported by a hinge pin so as to rotate relative to a camera body, and a battery lid body is attached outside the hinge plate so as to slide relative to the hinge plate. When the battery lid body slides to the hinge pin on the closing position of a battery lid, locking claws provided on the battery lid body are locked to the locking holes of a camera cover.

Patent document 1: Japanese Patent Laid-Open No. 2003-142841

DISCLOSURE OF THE INVENTION

Problem to be Solved by the Invention

In the battery lid structure of the prior art, the battery lid body only has the locking claws which are locked to the locking holes of the camera cover when the battery lid body slides to the hinge pin on the closing position of the battery lid, and any devices are not provided for stopping the sliding motion of the battery lid body when the battery lid is closed.

Thus it is considered that the battery lid structure of the prior art is further provided with the following configurations: a lock lever section sliding perpendicularly to the sliding direction of the battery lid body and an engagement section sliding perpendicularly to the sliding direction of the battery lid body in synchronization with the sliding motion of the lock lever section. The lock lever section and the engagement section are provided on the battery lid body. Further, the hinge plate has a long engagement hole which has the engagement section engaged therewith and is L-shaped in plan view. When the sliding motion of the battery lid body is stopped with the battery lid closed, the engagement section engages with a portion of the long engagement hole perpendicularly to the sliding direction of the battery lid body. When a photographer manually slides the battery lid, the engagement section engages with a portion of the long engagement hole in parallel with the sliding direction of the battery lid body.

The hinge plate is made of a metal to obtain stiffness for the battery lid. Thus the long engagement hole has a rough end face and the engagement section slides in the long engagement hole with a large sliding resistance. Therefore, the engagement section wears and a sliding motion is interfered by friction.

In view of the problem, an object of the present invention is to provide a battery lid structure for an electronic device which can prevent wear on an engagement section sliding in a long engagement hole and prevent friction from interfering with a sliding motion.

Means for Solving the Problem

In order to attain the object, a battery lid structure for an electronic device according to the present invention comprises:

a rotating plate pivotally supported so as to rotate relative to the electronic device;

a battery lid body slidably attached to the outside of the rotating plate perpendicularly to the rotation axis of the rotating plate;

a lock lever section slidably attached to the outside of the battery lid body in parallel with the rotation axis of the rotating plate;

a long engagement hole formed on the rotating plate; and an engagement section which is attached to the inside of the battery lid body, engages with the long engagement hole, and slides in parallel with the rotation axis of the rotating plate in synchronization with the sliding motion of the lock lever section, the battery lid structure opening and closing a battery case provided in the electronic device, wherein the long engagement hole is made up of a first long hole extended perpendicularly to the rotation axis of the rotating plate, and a second long hole which is extended in parallel with the rotation axis and has a first end joined to an end of the first long hole on the side of the rotation axis and formed next to the first long hole, the rotating plate has, outside the rotating plate, a plate spring body which engages with a part of the battery lid body during the sliding motion of the battery lid body and locks the battery lid body on a first position on the side of the rotation axis of the rotating plate and a second position on the opposite side from the rotation axis, the plate spring body has a sliding surface partially or entirely covering the wall surface of the long engagement hole integrally formed as a part of the plate spring body, the battery lid body has an urging member for urging the lock lever section to a second end of the second long hole on the opposite side from the first end, and the engagement section engages with the long engagement hole covered with the sliding surface, engages with the second long hole to prevent the sliding motion of the battery lid body when the battery lid body is disposed on the first position, is disengaged from the second long hole when the lock lever section slides to the first end of the second long hole, and engages with the first long hole during the sliding motion of the battery lid body.

ADVANTAGE OF THE INVENTION

According to a preferred embodiment, a sliding surface integrally formed on a plate spring body covers the wall surface of a long engagement hole, so that it is possible to prevent wear and damage on an engagement section sliding in contact with the wall surface of the long engagement hole and prevent friction from interfering with sliding motion. Further, the plate spring body has the function of locking a battery lid body as an essential function, so that another part is not necessary.

BEST MODE FOR CARRYING OUT THE INVENTION

Figure 1:
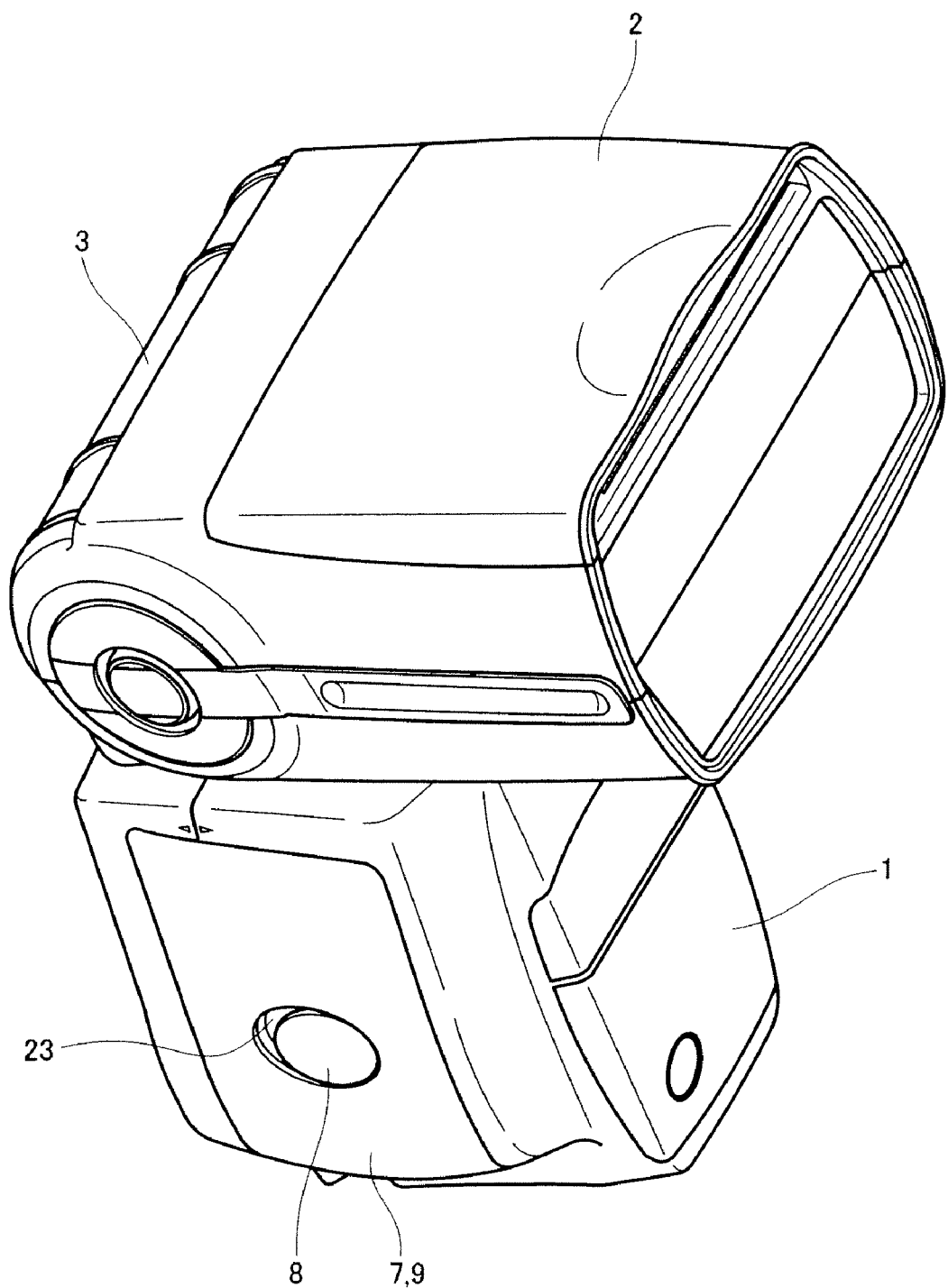
FIG. 1 is a perspective view showing a stroboscopic device from above according to an embodiment of the present invention.
Figure 2:
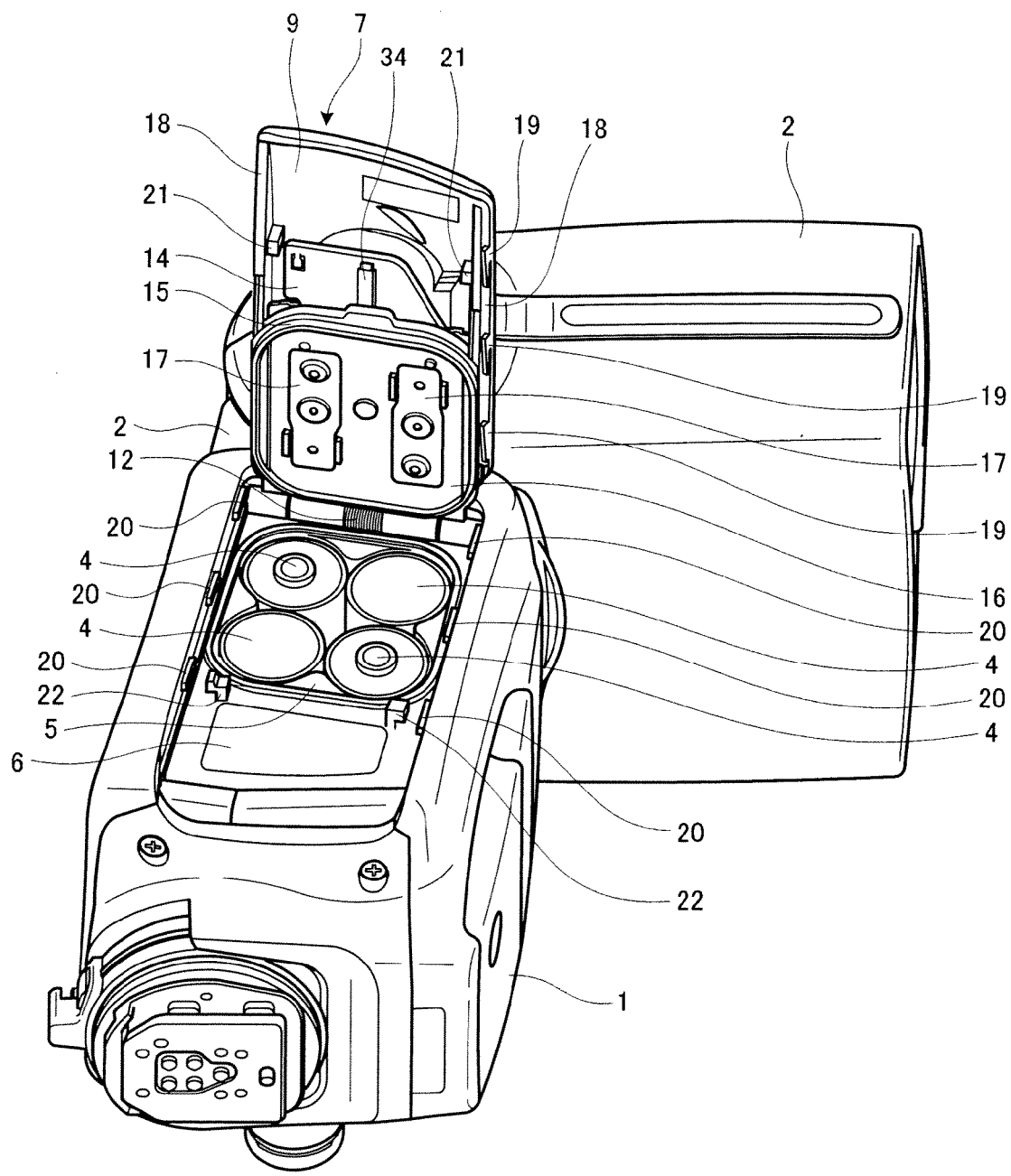
FIG. 2 is a perspective view showing the stroboscopic device from the bottom according to the embodiment of the present invention.
Figure 3:
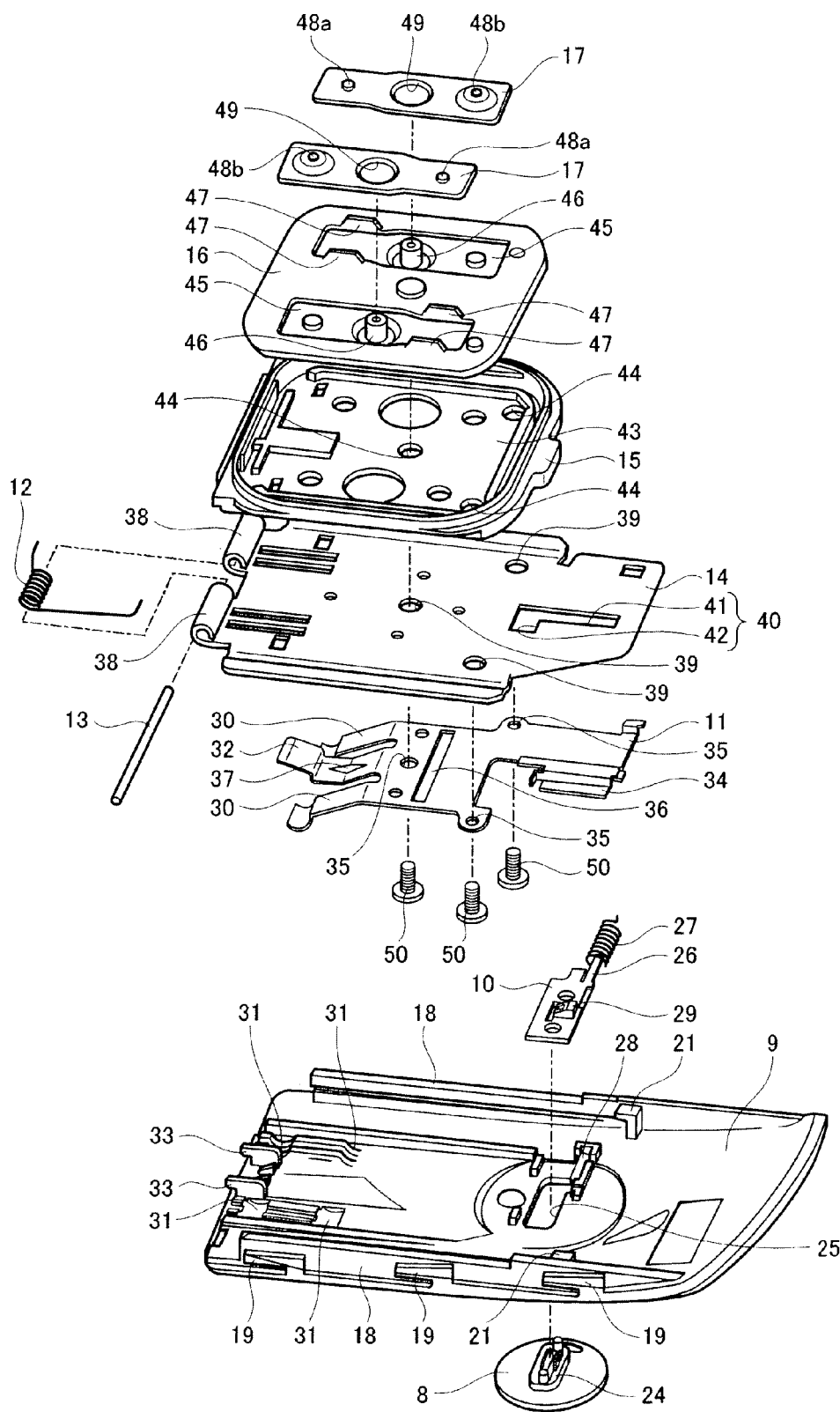
FIG. 3 is an exploded perspective view showing a battery lid according to the embodiment of the present invention.

An embodiment of the present invention will be described below in accordance with the accompanying drawings. In the present embodiment, a battery lid structure for a stroboscopic device will be described as an example of a battery lid for an electronic device. FIG. 1 is a perspective view showing the stroboscopic device from above with the battery lid closed according to the present embodiment. FIG. 2 is a perspective view showing the stroboscopic device from the bottom with the battery lid opened according to the present embodiment. FIG. 3 is an exploded perspective view showing the battery lid.

As shown in FIGS. 1 and 2, the stroboscopic device has a body 1, a light emitting part 2 for illuminating a subject, and a connecting part 3 for connecting the light emitting part 2 to the body 1. Further, a battery case 5 which can be loaded with four batteries 4 is provided in the body 1. On the right side of the body 1, there are disposed an opening recessed section 6 for the battery case and a battery lid 7 for opening and closing the opening recessed section 6. The battery lid 7 is supported by a hinge pin (not shown) rotationally fixed on the upper part (on the side of the light emitting part 1) of the right side of the body 1. The battery lid 7 can rotate to positions for opening and closing the battery case 5. As shown in FIG. 1, when the battery lid is closed, the battery lid 7 is fit into the opening recessed section 6 of the battery case.

As illustrated in the exploded perspective view of FIG. 3, the battery lid 7 has a lock lever section 8, a resin battery lid body 9, a lock lever receiving section 10, a plate spring body 11, a lid urging spring 12, a hinge pin 13 rotationally fixed on the body 1, a pressing plate (rotating plate) 14 rotationally supported by the hinge pin 13, a resin waterproof packing body 15 attached to the pressing plate 14, a resin terminal pressing plate 16 attached to the pressing plate 14 via the waterproof packing body 15, and two terminals 17 attached to the terminal pressing plate 16. The battery lid body 9 is slidably attached outside the pressing plate 14. The sliding direction of the battery lid body 9 is perpendicular to the rotation axis of the battery lid 7, that is, the rotation axis of the pressing plate 14 (the rotation axis of the hinge pin 13). When the battery lid body 9 slides to the bottom of the body 1 from the closed state of the battery lid shown in FIG. 1, the battery lid 7 can be opened.

As shown in FIGS. 2 and 3, the battery lid body 9 has slide guide sections 18 on both end faces relative to a direction parallel to the rotation axis of the hinge pin 13, the slide guide sections 18 protruding to the battery case 5. The slide guide sections 18 engage with both ends of the pressing plate 14 relative to the direction parallel to the rotation axis of the hinge pin 13. With this configuration, the battery lid body 9 is slidably attached outside the pressing plate 14.

On the outside of the slide guide sections 18, three slide engagement sections 19 are formed to be opened on the side of the hinge pin 13 and are L-shaped in cross section. Further, three engaged sections 20 are formed on both wall surfaces of the opening recessed section 6 of the battery case, the wall surfaces being opposed to the slide guide sections 18. When the battery lid body 9 is disposed on a locking position (first position) on the side of the rotation axis of the pressing plate 14 (on the side of the hinge pin 13), the engaged sections 20 are engaged with the slide engagement sections 19 L-shaped in cross section and thus the battery lid body 9 is kept closed. When the battery lid body 9 slides to an unlocking position (second position) on the opposite side (the bottom of the body 1) from the rotation axis of the pressing plate 14 to cancel the engagement, the battery lid 7 rotates to an opening position by the urging force of the lid urging spring 12.

In this configuration, the engaged sections 20 are L-shaped in cross section so as to be opened on the opposite side from the rotation axis of the pressing plate 14 (the opposite side from the hinge pin). When the battery lid body 9 slides to the opposite side from the hinge pin, the surfaces of the slide engagement sections 19 on the opposite side from the hinge pin come into contact with the surfaces of the engaged sections 20 on the side of the hinge pin. With this configuration, the sliding motion of the battery lid body 9 can be stopped on the unlocking position.

Further, on the inner surface of the battery lid body 9, two locking claws 21 are provided which are L-shaped in cross section. When the battery lid body 9 is disposed on the locking position, the locking claws 21 engage with two locked sections 22 provided in the opening recessed section 6 of the battery case, so that the battery lid body 9 is kept closed. When the battery lid body 9 slides to the opposite side from the hinge pin, the locking claws 21 and the locked sections 22 are disengaged from each other.

As shown in FIG. 1, on the outer surface of the battery lid body 9, that is, on the opposite side from the battery case 5, a recessed section 23 is provided. On the recessed section 23, the lock lever section 8 is attached so as to be slidable in parallel with the rotation axis of the battery lid 7, that is, the rotation axis of the pressing plate 14 (the rotation axis of the hinge pin 13).

As shown in FIG. 3, in the recessed section 23 of the battery lid body 9, a slide hole 25 is formed to which a protrusion 24 provided inside the lock lever section 8 (on the side of the battery lid body 9) is inserted. The slide hole 25 is extended perpendicularly to the sliding direction of the battery lid body 9, that is, in parallel with the rotation axis of the battery lid 7. The lock lever section 8 can slide in the same direction.

The lock lever section 8 is a locking member which prevents the battery lid body 9 from sliding relative to the pressing plate 14 when the battery lid body 9 is disposed on the locking position. In other words, when the lock lever section 8 is disposed on a lock position at the front of the body 1, the sliding motion of the battery lid body 9 is locked. When a photographer manually slides the lock lever section 8 to the rear of the body 1 to place the lock lever section 8 on an unlock position, the battery lid body 9 is unlocked. In the unlocked state, the photographer can manually slide the battery lid body 9 to the opposite side from the hinge pin.

As shown in FIG. 3, the lock lever receiving section 10 is disposed on the inner surface of the battery lid body 9. The lock lever receiving section 10 has holes to which the protrusion 24 of the lock lever section 8 is fit. In other words, the lock lever section 8 is disposed in the recessed section 23 of the battery lid body 9 such that the protrusion 24 protrudes from the slide hole 25, and the protrusion 24 protruding from the slide hole 25 is fit into the holes of the lock lever receiving section 10 disposed on the inner surface of the battery lid body 9. With this configuration, the lock lever section 8 is slidably fixed in the recessed section 23 of the battery lid body 9.

On the inner surface of the battery lid body 9, a fitting section 28 is formed to which an urging helical spring (urging member) 27 attached to a protrusion 26 of the lock lever receiving section 10 is fit. The protrusion 26 protrudes to the rear of the body 1. By the urging force of the urging helical spring 27 which is attached to the protrusion 26 and is fit to the fitting section 28, the lock lever section 8 is urged to the front of the body 1 all the time. In other words, by the urging force of the urging helical spring 27, the lock lever section 8 is disposed on the lock position and the sliding motion of the battery lid body 9 is locked when the battery lid body 9 is disposed on the locking position. When the photographer manually slides the lock lever section 8 to the unlock position against the urging force of the urging helical spring 27, the sliding motion of the battery lid body 9 is unlocked.

On the lock lever receiving section 10, an engagement section 29 is formed which protrudes to the pressing plate 14 and engages with the long engagement hole of the pressing plate 14 which will be described later. The engagement section 29 attached inside the battery lid body 9 slides in parallel with the rotation axis of the pressing plate 14 in synchronization with the sliding motion of the lock lever section 8 when the battery lid body 9 is disposed on the locking position. When the lock lever section 8 is disposed on the unlock position, the engagement section 29 slides perpendicularly to the rotation axis of the pressing plate 14 in synchronization with the sliding motion of the battery lid body 9.

Further, on the inner surface of the battery lid body 9, temporary engagement sections 31 are provided where clicking springs 30 provided on the plate spring body 11 engage on the locking position and the unlocking position. Furthermore, on the inner surface of the battery lid body 9, lid stopping protrusions 33 are provided which come into contact with a lid stopping section 32 on the plate spring body 11 when the battery lid body 9 slides to the opposite side from the hinge pin. The lid stopper 32 and the lid stopping protrusions 33 are members for stopping the sliding motion of the battery lid body 9 on the unlocking position.

The plate spring body 11 includes the clicking springs 30 and the lid stopping section 32 which are integrally formed as a part of the plate spring body 11. The clicking springs 30 are urging members for positioning the battery lid body 9 on the locking position and the unlocking position. In other words, the clicking springs 30 engage with the temporary engagement section 31 during the sliding motion of the battery lid body 9 and lock the battery lid body 9 on the locking position and the unlocking position. The plate spring body 11 further includes a trace section 34 integrally formed as a part of the plate spring body 11. The trace section 34 acts as a sliding surface partially or entirely covering the wall surface (end face) of the long engagement hole of the pressing plate 14, which will be described later.

The plate spring body 11 further includes screw holes 35 for attaching the plate spring body 11 to the pressing plate 14. Moreover, on the plate spring body 11, a rib 36 is formed for preventing bending and a recessed section 37 is formed for reinforcing the lid stopping section 32.

The pressing plate 14 is formed of a metal plate (e.g., a stainless plate) to secure the stiffness of the battery lid 7. The pressing plate 14 includes shaft support sections 38 where the hinge pin 13 is rotationally fit on the side of the rotation axis. The pressing plate 14 is pivotally supported by the hinge pin 13 so as to rotate relative to the body 1. The pressing plate 14 further includes screw holes 39 for attaching the plate spring body 11 outside the pressing plate 14 and attaching the waterproof packing body 15 and the terminal pressing plate 16 inside the pressing plate 14. The lid urging spring 12 is supported by the hinge pin 13 inserted into the shaft support sections 38.

Further, on the pressing plate 14, a long engagement hole 40 is formed where the engagement section 29 of the lock lever receiving section 10 engages. The long engagement hole 40 is L-shaped in plan view. In other words, the long engagement hole 40 is made up of a first long hole 41 extended in the sliding direction of the battery lid body 9 (perpendicularly to the rotation axis of the pressing plate 14) and a second long hole 42 extended perpendicularly to the sliding direction of the battery lid body 9, that is, in parallel with the sliding direction of the lock lever section 8 (in parallel with the rotation axis of the pressing plate 14). The second long hole 42 has one end (first end) joined to one end of the first long hole 41 on the side of the hinge pin 13 (on the side of the rotation axis of the pressing plate 14) and formed next to the first long hole 41.

When the lock lever section 8 is disposed on the lock position, the engagement section 29 of the lock lever receiving section 10 is disposed on the other end (second end) of the second long hole 42. When the lock lever section 8 is disposed on the unlock position, the engagement section 29 is disposed on the one end (first end) of the second long hole 42.

In other words, when the battery lid body 9 is disposed on the locking position, the lock lever section 8 is urged to the second end of the second long hole 42 by the urging force of the urging helical spring 27 and is disposed on the lock position, and the engagement section 29 of the lock lever receiving section 10 is disposed on the second end of the second long hole 42. When the photographer manually slides the lock lever section 8 to the first end of the second long hole 42 and places the lock lever section 8 on the unlock position, the engagement section 29 is disposed on the first end of the second long hole 42.

Thus the engagement section 29 which engages with the long engagement hole 40 having the wall surface (end face) partially or entirely covered with the trace section 34 engages with the second long hole 42 to prevent the sliding motion of the battery lid body 9 when the battery lid body 9 is disposed on the locking position. When the photographer manually places the lock lever section 8 on the unlock position, the engagement section 29 is disengaged from the second long hole 42, enabling the sliding motion of the battery lid body 9. During the sliding motion of the battery lid body 9, the engagement section 29 engages with the first long hole 41 and slides perpendicularly to the rotation axis of the pressing plate 14 in synchronization with the sliding motion of the battery lid body 9.

Although the lock lever section 8 and the lock lever receiving section 10 may be made of metals, resins can improve sliding because the trace section 34 of the plate spring body 11 entirely or partially covers the wall surface of the long engagement hole 40.

The wall surface of the long engagement hole 40 is covered with the trace section 34 integrally formed on the plate spring body 11, thereby preventing wear and damage on the resin engagement section 29 which slides in contact with the wall surface of the long engagement hole 40. Moreover, the engagement section 29 has a small depth in the depth direction of the long engagement hole 40, so that even the lock lever receiving section 10 made of resin can reduce the probability of damage on the lock lever receiving section 10. After the battery lid 7 is closed, the lock lever section 8 is smoothly returned to the lock position by the urging helical spring 27. Further, since the plate spring body 11 has essential functions (prevention of a slide, clicking), another part is not necessary.

The waterproof packing body 15 has a recessed section 43 to which the terminal pressing plate 16 is fit on the side of the battery case 5. When the battery lid 7 is disposed on a closing position, the outer wall surface of the recessed section 43 of the waterproof packing body 15 comes into contact with the inner wall surface of the battery case 5 to make the internal space of the battery case 5 watertight. The waterproof packing body 15 further includes screw holes 44.

As shown in FIG. 2, the terminal pressing plate 16 is fit into the recessed section 43 of the waterproof packing body 15. The terminal pressing plate 16 further includes screw holes (not shown) opened on the side of the pressing plate 14 (the opposite side from the battery case 5). Moreover, on a surface of the terminal pressing plate 16 on the side of the battery case 5, there are provided recessed sections 45 for attaching the terminals and first protrusions 46. The terminal pressing plate 16 further includes second protrusions 47 around positive terminals to prevent batteries from being inserted in reverse orientation.

The terminals 17 each include contact sections 48a and 48b and a through hole 49. The terminals 17 are fit into the recessed sections 45 of the terminal pressing plate 16, and the first protrusions 46 inserted into the through holes 49 are thermally caulked, so that the terminals 17 are fixed to the terminal pressing plate 16.

The battery lid 7 is assembled as follows: the plate spring body 11 is disposed on the opposite side of the pressing plate 14 from the battery case 5, and the terminal pressing plate 16 which has the terminals 17 fixed thereon and is fit into the recessed section 43 of the waterproof packing body 15 is disposed on the pressing plate 14 on the side of the battery case 5. Further, screws 50 are inserted from the plate spring body 11 through the screw holes 35 of the plate spring body 11, the screw holes 39 of the pressing plate 14, the screw holes 44 of the waterproof packing body 15, and the screw holes of the terminal pressing plate 16, so that the plate spring body 11, the waterproof packing body 15, and the terminal pressing plate 16 are attached to the pressing plate 14. Both ends of the pressing plate 14 to which the plate spring body 11 and so on are attached are engaged with the slide guide sections 18 of the battery lid body 9, relative to a direction parallel to the rotation axis of the hinge pin 13.

In the assembled battery lid 7, the battery lid body 9 can slide to the opposite side from the hinge pin by a predetermined amount relative to the pressing plate 14. The battery lid 7 assembled thus is rotationally attached to the end of the opening recessed section 6 of the battery case by the hinge pin 13. The battery lid 7 attached by the hinge pin 13 opens and closes the opening recessed section 6 of the battery case.

When the battery lid 7 is placed on the closing position and the battery lid body 9 slides to the locking position on the side of the hinge pin 13, the lock lever section 8 is placed on the lock position by the urging force of the urging helical spring 27 and the engagement section 29 of the lock lever receiving section 10 engages with the second long hole 42 of the long engagement hole 40 of the pressing plate 14. Thus in this case, the sliding motion of the battery lid body 9 is locked and the battery lid 7 is locked on the closing position.

When a user closes the battery lid 7, the battery lid 7 is pressed by fingers to fit the outer periphery (rib) of the recessed section 43 of the waterproof packing body 15 into the inner periphery of the battery case 5, and the rib of the recessed section 43 of the waterproof packing body 15 is brought into contact with the inner periphery of the battery case 5 by a predetermined strained force. The rib of the waterproof packing body 15 is fit into the battery case 5 and is brought into contact with the inner periphery of the battery case 5, so that the battery case 5 is kept watertight. The batteries 4 loaded in the battery case 5 are urged to the opening by an urging member (not shown) and the electrodes of the four batteries 4 come into contact with the terminals 17.

When the user opens the battery case 5, the lock lever section 8 is temporarily slid to the unlock position to disengage the engagement section 29 of the lock lever receiving section 10 from the second long hole 42 of the long engagement hole 40 of the pressing plate 14, and then the battery lid body 9 is slid to the unlocking position on the opposite side from the hinge pin. During the sliding motion to the opposite side from the hinge pin, when the clicking springs 30 of the plate spring body 11 engage with the temporary engagement section 31 of the battery lid body 9, the battery lid body 9 is clicked and held on the unlocking position. While the clicking springs 30 engage with the temporary engagement section 31, the lid stopping section 32 of the plate spring body 11 comes into contact with the lid stopping protrusions 33 of the battery lid body 9 and the surfaces of the slide engagement sections 19 of the battery lid body 9 on the opposite side from the hinge pin come into contact with the surfaces of the engaged sections 20 of the opening recessed section 6 of the battery case on the side of the hinge pin 13, so that the battery lid body 9 cannot slide any more.

Industrial Applicability

A battery lid structure for an electronic device according to the present invention has a battery lid allowing a battery case to be opened when a battery lid body is slid with the battery lid closed, the battery lid structure further including: a long engagement hole for preventing the battery lid body from sliding when the battery lid is closed, and an engagement section sliding while engaging with the long engagement hole. This structure can prevent wear of the engagement section sliding in the long engagement hole and prevent friction from interfering with a sliding motion, so that the battery lid structure is useful as a lid of a case for batteries and the like.

The invention claimed is:

1. A battery lid structure for an electronic device and for opening and closing a battery case in the electronic device, the battery lid structure comprising:
   a rotating plate pivotally supported for rotation relative to the electronic device about a rotation axis;
   a battery lid body slidably attached to an outside of the rotating plate for sliding relative to the rotating plate and transverse to the rotation axis;
   a lock lever section slidably attached to an outside of the battery lid body for sliding thereon parallel to the rotation axis;
   an urging member disposed inside the battery lid body for urging the lock lever section in a direction parallel to the rotation axis;
   an engagement hole in the rotating plate and comprising first and second holes, the first hole extending perpendicular to the rotation axis, the second hole joined to an end portion of the first hole and extending parallel to the rotation axis and in the direction in which the urging member urges the lock lever section;
   a plate spring body between the rotating plate and the battery lid body and comprising a portion for at least partially covering a wall surface of the engagement hole, the plate spring body for engaging a portion of the battery lid body to position the battery lid body in first and second positions during sliding thereof, with the first position being closer to the rotation axis than the second position; and
   an engagement section inside the battery lid body for engaging with the engagement hole and sliding parallel to the rotation axis during sliding of the lock lever section,
   the engagement section engageable with the second hole to prevent sliding of the battery lid body relative to the rotating plate when the battery lid body is disposed in the first position,
   the engagement section disengageable from the second hole to permit sliding of the battery lid body relative to the rotating plate when the lock lever section slides on the battery lid body in a direction opposite to urging by the urging member, and
   the engagement section engageable with the first hole during sliding of the battery lid body relative to the rotating plate.

* * * * *

UNITED STATES PATENT AND TRADEMARK OFFICE
CERTIFICATE OF CORRECTION

PATENT NO. : 8,241,783 B2
APPLICATION NO. : 12/523325
DATED : August 14, 2012
INVENTOR(S) : Kunio Tsuji It is certified that error appears in the above-identified patent and that said Letters Patent is hereby corrected as shown below:

Title Page, Item 73, currently reads:

--Assignees: Panasonic Corporation, Osaka (JP);
Canon Kabushiki Kaisha, Tokyo (JP)--

Title Page, Item 73, should read:

--Assignees: Panasonic Photo & Lighting Co., Ltd., Osaka (JP);
Canon Kabushiki Kaisha, Tokyo (JP)--

Signed and Sealed this
Twenty-second Day of January, 2013

David J. Kappos
*Director of the United States Patent and Trademark Office*